US012361130B2

(12) United States Patent
Chechik et al.

(10) Patent No.: US 12,361,130 B2
(45) Date of Patent: Jul. 15, 2025

(54) REAL-TIME SHELLCODE DETECTION AND PREVENTION

(71) Applicant: PALO ALTO NETWORKS (ISRAEL ANALYTICS) LTD., Tel Aviv (IL)

(72) Inventors: Or Chechik, Rishon LeZion (IL); Liav Zigelbaum, Herzliya (IL); Eldar Aharoni, Holon (IL); Bar Lahav, Herzliya (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 109 days.

(21) Appl. No.: 18/301,366

(22) Filed: Apr. 17, 2023

(65) Prior Publication Data

US 2024/0346145 A1    Oct. 17, 2024

(51) Int. Cl.
G06F 21/56    (2013.01)

(52) U.S. Cl.
CPC .......... G06F 21/566 (2013.01); G06F 21/564 (2013.01)

(58) Field of Classification Search
CPC ...... G06F 21/566; G06F 21/564; G06F 21/56; G06F 21/52
See application file for complete search history.

(56) References Cited

U.S. PATENT DOCUMENTS

| 8,205,257 | B1 | 6/2012 | Satish et al. |
| 8,646,076 | B1 * | 2/2014 | Lim ..................... G06F 21/566 726/22 |
| 8,990,944 | B1 | 3/2015 | Singh et al. |
| 9,659,182 | B1 * | 5/2017 | Roundy .............. G06F 21/6218 |
| 10,193,918 | B1 | 1/2019 | Patton et al. |
| 10,503,904 | B1 | 12/2019 | Singh et al. |
| 10,860,718 | B2 * | 12/2020 | Seetharamaiah ... G06F 9/45558 |

(Continued)

FOREIGN PATENT DOCUMENTS

| WO | 2022109664 A1 | 6/2022 |
| WO | 2022248920 A1 | 12/2022 |
| WO | 2023133582 A1 | 7/2023 |

OTHER PUBLICATIONS

International Application # PCT/IB2024/051414 Search Report dated Apr. 17, 2024.

(Continued)

*Primary Examiner* — Jayesh M Jhaveri
(74) *Attorney, Agent, or Firm* — Meitar Patents Ltd.; Daniel Kligler

(57) ABSTRACT

Methods, storage systems and computer program products implement embodiments of the present invention for protecting a computing device, which includes a processor and a memory and is coupled to a storage device storing a set of one or more files. In embodiments of the present invention, a call to a specified function for execution by the processor is detected, and a stack trace for the call to the specified function is generated in the memory. Upon detecting, in the stack trace, a stack frame including a return address referencing a shellcode region in the memory, wherein the shellcode region includes executable code that was not loaded from any given file on the storage device, then the referenced executable code is compared to a list of malicious shellcode. Finally, a preventive action is initiated upon detecting a match between the referenced executable code and one of malicious shellcodes in the list.

21 Claims, 3 Drawing Sheets

(56) References Cited

U.S. PATENT DOCUMENTS

| | | | | |
|---|---|---|---|---|
| 11,216,559 | B1* | 1/2022 | Gu | G06F 21/564 |
| 11,409,868 | B2* | 8/2022 | Reid | G06F 21/554 |
| 11,520,886 | B2 | 12/2022 | Levy et al. | |
| 11,886,585 | B1* | 1/2024 | Davis | G06F 21/566 |
| 11,934,801 | B2* | 3/2024 | Rahmani | G06F 8/33 |
| 2004/0049693 | A1* | 3/2004 | Douglas | H04L 63/1408 726/23 |
| 2014/0115652 | A1 | 4/2014 | Kapoor et al. | |
| 2015/0215335 | A1 | 7/2015 | Giuliani et al. | |
| 2016/0055337 | A1* | 2/2016 | El-Moussa | G06F 21/566 726/23 |
| 2016/0232347 | A1* | 8/2016 | Badishi | G06F 21/54 |
| 2017/0180421 | A1 | 6/2017 | Shieh et al. | |
| 2018/0115577 | A1 | 4/2018 | Shukla et al. | |
| 2018/0189490 | A1 | 7/2018 | Maciejak et al. | |
| 2018/0191779 | A1 | 7/2018 | Shieh et al. | |
| 2018/0211038 | A1 | 7/2018 | Breiman et al. | |
| 2018/0248896 | A1 | 8/2018 | Challita et al. | |
| 2019/0087572 | A1 | 3/2019 | Ellam et al. | |
| 2019/0109870 | A1 | 4/2019 | Bedhapudi et al. | |
| 2019/0121978 | A1 | 4/2019 | Kraemer et al. | |
| 2019/0318090 | A1 | 10/2019 | Sandoval et al. | |
| 2019/0325133 | A1 | 10/2019 | Goodridge et al. | |
| 2019/0347418 | A1 | 11/2019 | Strogov et al. | |
| 2020/0089876 | A1 | 3/2020 | Aharoni et al. | |
| 2020/0106808 | A1 | 4/2020 | Schutz et al. | |
| 2020/0183820 | A1 | 6/2020 | Hebert et al. | |
| 2020/0204589 | A1 | 6/2020 | Strogov et al. | |
| 2020/0342100 | A1* | 10/2020 | Goldstein | G06F 21/563 |
| 2021/0152595 | A1 | 5/2021 | Hansen et al. | |
| 2022/0284095 | A1* | 9/2022 | Ahmed | G06F 21/554 |
| 2023/0084691 | A1 | 3/2023 | Levy et al. | |

OTHER PUBLICATIONS

U.S. Appl. No. 17/979,004 Office Action dated Jan. 19, 2024.
Palo Alto Networks, "Cortex XDR," Datasheet, pp. 1-9, year 2023.
Blackberry, "Threat Spotlight: Petya-Like Ransomware is Nasty Wiper", pp. 1-22, Nov. 7, 2017, as downloaded from https://blogs.blackberry.com/en/2017/07/threat-spotlight-petya-like-ransomware-is-nasty-wiper.
AU Application # 2021319159 Office Action dated May 25, 2023.
Cristalli et al., "Trusted Execution Path for Protecting Java Applications Against Deserialization of Untrusted Data," Proceedings, International Conference, ICB 2007—Advances in Biometrics, Springer Nature Switzerland AG, pp. 445-464, year 2018.
Wikipedia, "Java Remote Method Invocation," pp. 1-4, last edited Dec. 26, 2020.
Wikipedia, "Metasploit Project," pp. 1-7, last edited Jun. 7, 2022.
CYNET, "Cobalt Strike: White Hat Hacker Powerhouse in the Wrong Hands," pp. 1-6, last updated Jun. 27, 2022, as downloaded from https://web.archive.org/web/20220627023847/https://www.cynet.com/network-attacks/cobalt-strike-white-hat-hacker-powerhouse-in-the-wrong-hands/.
Shah, "Analyzing CVE-2017-9791: Apache Struts Vulnerability Can Lead to Remote Code Execution,", McAfee, pp. 1-7, Jul. 19, 2017, as downloaded from https://www.mcafee.com/blogs/other-blogs/mcafee-labs/analyzing-cve-2017-9791-apache-struts-vulnerability-can-lead-remote-code-execution/.
Frohoff, "A Proof-of-Concept Tool for Generating Payloads that Exploit unsafe Java Object Deserialization," github.com, pp. 1-3, Jul. 16, 2022, as downloaded from https://github.com/frohoff/ysoserial.
Wikipedia, "Return-oriented Programming," pp. 1-6, last edited Mar. 31, 2020, as downloaded from https://web.archive.org/web/20200403142512/https://en.wikipedia.org/wiki/Return-oriented_programming.
McNab, "Network Security Assessment", 2nd edition, Chapter 16 (Exploitation Frameworks), pp. 393-414, Oct. 2007.
Balakrishnan, "Understanding Java Agents," Tutorial, pp. 1-8, Jul. 6, 2020, as downloaded from https://dzone.com/articles/java-agent-1.
Wikipedia, "Java Virtual Machine," pp. 1-8, last update Oct. 25, 2022.
International Application # PCT/US2025/016969 Search Report dated Apr. 22, 2025.

* cited by examiner

REAL-TIME SHELLCODE DETECTION AND PREVENTION

FIELD OF THE INVENTION

The present invention relates generally to computer security, and particularly detecting operations performed by a computing device in response to the execution of malicious shellcode.

BACKGROUND OF THE INVENTION

In many computers and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to detect and prevent malware from spreading through the network.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for protecting a computing device, which includes a processor and a memory and is coupled to a storage device storing a set of one or more files, the method including detecting, by the processor, a call to a specified function for execution by the processor, generating, in the memory, a stack trace for the call to the specified function, detecting, in the stack trace, a stack frame including a return address referencing a shellcode region in the memory, wherein the shellcode region includes executable code that was not loaded from any given file on the storage device, comparing the referenced executable code to a list of malicious shellcode, and initiating a preventive action upon detecting a match between the referenced executable code and one of malicious shellcodes in the list.

In one embodiment, the referenced executable code executes in kernel mode.

In another embodiment, the referenced executable code executes in user mode.

In an additional embodiment, the shellcode includes an application programming interface (API) hashing algorithm.

In a further embodiment, the list of malicious shellcode includes a list of signatures, and wherein comparing the referenced executable code to a list of malicious shellcode includes extracting one or more shellcode buffers from the referenced executable code, and comparing the one or more extracted shellcode buffers to the list of signatures.

In a supplemental embodiment, the signature in the list includes a wildcard.

In one embodiment, the specified function loads an executable library to the memory.

In another embodiment, the specified function creates a new thread in the memory.

In an additional embodiment, the specified function creates a new process in the memory.

In a further embodiment, the specified function initiates a new connection.

In a supplemental embodiment, the specified function listens for an incoming connection.

In one embodiment, the specified function communicates with kernel drivers so as to provide a view of input data and output data.

In another embodiment, the memory includes a set of memory pages, and wherein the specified function allocates one or more of the memory pages to a process in the memory.

In an additional embodiment, the memory includes a set of memory addresses, and wherein the specified function changes a memory permission of a given memory address.

In a further embodiment, the specified function retrieves a buffer from an address in the memory.

In a supplemental embodiment, the specified function writes a buffer to an address in the memory.

In one embodiment, the specified function sets a thread context of a thread in the memory.

In another embodiment, the specified function adds an asynchronous procedure call (APC) to an APC queue in a thread in the memory.

In an additional embodiment, the specified function injects additional executable code into a process in the memory.

There is also provided, in accordance with an embodiment of the present invention, an apparatus for protecting a computing device, including a memory, and a processor coupled to a storage device storing a set of one or more files and configured to detect a call to a specified function for execution by the processor, to generate, in the memory a stack trace for the call to the specified function, to detect, in the stack trace, a stack frame including a return address referencing a shellcode region in the memory, wherein the shellcode region includes executable code that was not loaded from any given file on the storage device, to compare the referenced executable code to a list of malicious shellcode, and to initiate a preventive action upon detecting a match between the referenced executable code and one of malicious shellcodes in the list.

There is additionally provided, in accordance with an embodiment the present invention, a computer software product for protecting a computing device, which includes a processor and a memory and is coupled to a storage device storing a set of one or more files, the computer software product including a non-transitory computer-readable medium, in which program instructions are stored, which instructions, when read by a computer, cause the computer to detect a call to a specified function for execution by the processor, to generate, in the memory, a stack trace for the call to the specified function, to detect, in the stack trace, a stack frame including a return address referencing a shellcode region in the memory, wherein the shellcode region includes executable code that was not loaded from any given file on the storage device, to compare the referenced executable code to a list of malicious shellcode, and to initiate a preventive action upon detecting a match between the referenced executable code and one of malicious shellcodes in the list.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1A:
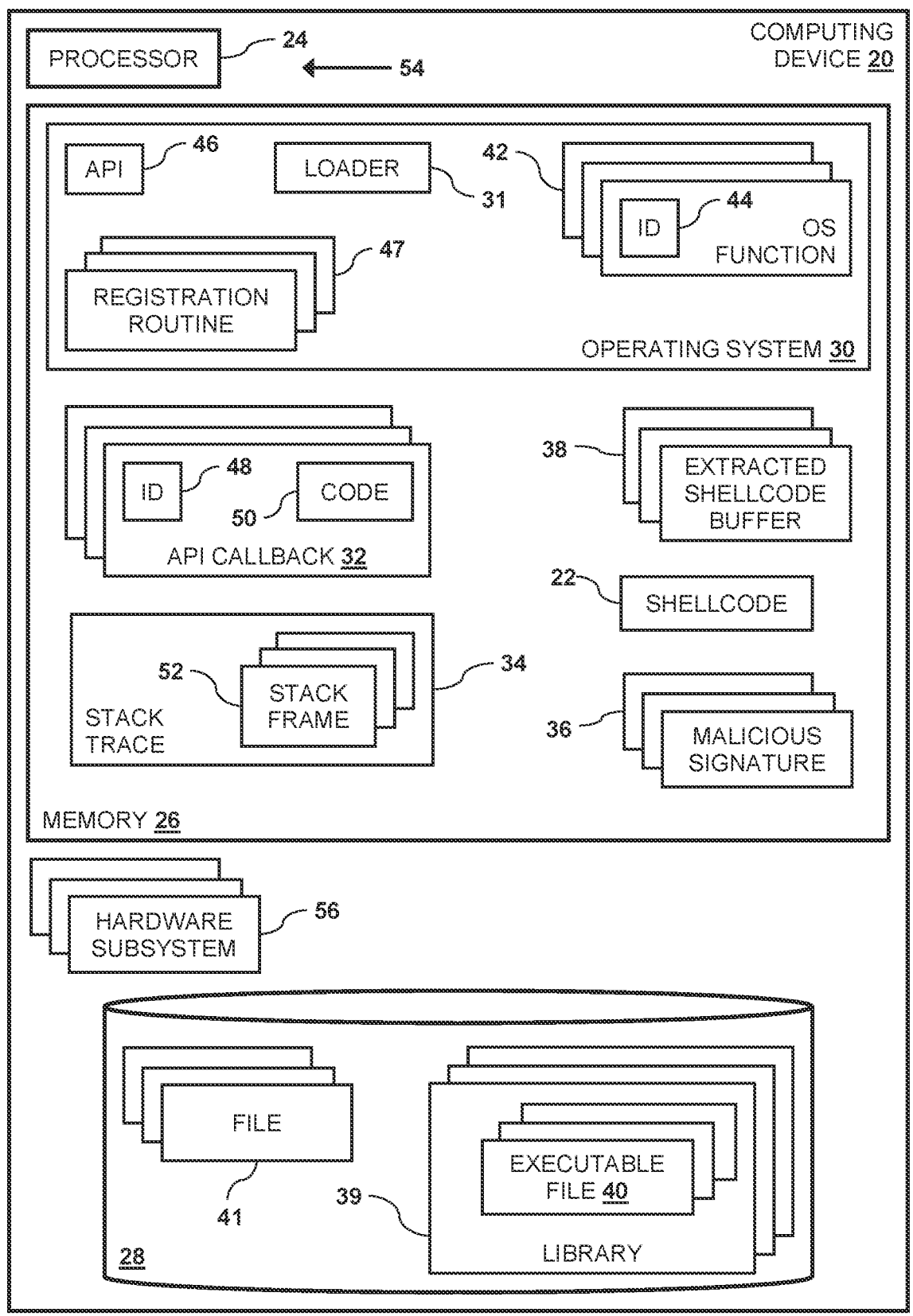
FIGS. 1A and 1B, also referred to herein collectively as FIG. 1, are block diagrams showing an example of a computing device that uses hooked operating system functions and a stack trace for detecting malicious shellcode, in accordance with an embodiment of the present invention.

In embodiments described herein, shellcode comprises computer executable code that (i.e., prior to execution) a processor did not load from an executable file stored on a storage device. In some instances, shellcode can be a set of malicious instructions (i.e., code) that are used for post exploitation (i.e., an action taken after a session is initiated) in an operating system or a software application. There are several types of malicious shellcode, each with a different purpose. Examples of malicious shellcode include:

Reverse Shell: This type of shellcode creates a reverse shell, which is a shell that runs on a target system and connects back to an attacker's system. This type of shellcode is often used in remote exploitation scenarios, where the attacker wants to take control of the target system.

Bind Shell: This type of shellcode opens a shell on a specific port on a target system, allowing an attacker to connect to it directly. This type of shellcode is useful for situations where the attacker has already gained access to the target system but needs a more direct way to interact with it.

Download and Execute: This type of shellcode downloads a file from a remote location and executes it on a target system. This type of shellcode is often used to download and install malware on the target system.

Add User: This type of shellcode adds a new user to a target system, giving an attacker additional access and control. This type of shellcode is often used in combination with other types of shellcode, such as a reverse shell, to establish a persistent presence on the target system.

Execute Command: This type of shellcode executes a specific command on a an target system, allowing attacker to carry out a specific task. This type of shellcode is often used in combination with other types of shellcode, such as a reverse shell, to carry out more complex attacks.

Executable file loading (reflective loading): In this attack, an executable file is loaded from a storage device (e.g., via a network connection) into memory. In an attack, the executable file can be a module of an attacker's malware. Alternatively, a malware packer may comprise shellcode that is configured to load an unpacked executable file into memory. This attack is typically limited to computers executing the WINDOWS™ operating system, produced by Microsoft Corporation, Redmond, Washington, USA.

Embodiments of the present invention provide methods and systems for protecting a computer device that (a) includes a processor and a memory, and (b) is coupled to a storage device that stores a set of one or more files. As described hereinbelow, upon the processor detecting a call to a specified function for execution (i.e., by the processor), a stack trace for the call to the specified function is generated.

If a stack frame in the stack trace is detected that comprises a return address referencing a shellcode region in the memory, then the referenced executable code is compared to a list of malicious shellcode. Finally, a preventive action is initiated upon detecting a match between the referenced executable code and one of malicious shellcodes in the list.

In embodiments herein, the computer device executes an operating system comprising a loader, and the shellcode region comprises executable code that was not loaded, by the operating system's loader, from any executable file on the storage device into the memory.

In some embodiments, the specific functions can be "hooked" so that their stack traces can be analyzed in response to calls to the specific functions. By hooking the specific functions, systems implementing embodiments of the present invention can analyze stack traces of those functions prior to any malicious operations that can be performed by these functions (e.g., loading a library or creating a new process thread).

Malicious shellcode is typically encoded and therefore difficult to detect. Systems implementing embodiments of the present invention enable detecting encoded shellcode by analyzing the stack trace upon a hooked function being called. Since this analysis is performed after the shellcode has been decoded/decrypted and has started executing, implementing these embodiments enable the shellcode to be detected in the memory regardless of how the shellcode was encoded/encrypted.

System Description

FIGS. 1 and 1A, also referred to herein collectively as FIG. 1, are block diagrams showing an example of a computing device 20 that is configured to detect, in real-time, a cyberattack that uses malicious shellcode 22 (also referred to herein simply as malicious code 22 or shellcode 22), in accordance with an embodiment of the present invention. In the configuration shown in FIG. 1A, computing device 20 comprises a processor 24 and a memory 26.

In embodiment described herein, processor 24 and memory 26 in computing device 20 are coupled to a storage device 28. In some embodiments, computing device 20 may comprise controller (not shown) such as Serial AT Attachment (SATA) or Serial-Attached SCSI (SAS) that connects the computing device to storage device 28. In other embodiments, storage device 28 may be in a network attached storage (NAS) system or in a storage area network (SAN) that is coupled to computing device 22 via a network connection (not shown).

Memory 26 may store shellcode 22, an operating system 30 comprising a loader 31, a set of API callbacks 32, a stack trace 34, a list of malicious signatures 36 (also referred to herein as a list of malicious shellcode 36), and a set of extracted shellcode buffers 38. Storage device 28 may store a set of libraries 39 comprising executable files 40 such as dynamic link library (DLL) files. Libraries 39 may also be referred to herein as executable libraries 39. In some embodiments, storage device 28 may store a set of additional non-executable files 41.

As described hereinbelow, shellcode 22 comprises executable code (e.g., a dynamic link library) that processor 24 did not load from a given executable file 40 (or file 41) on storage device 28 to memory 26.

In some embodiments, malicious signatures 36 comprise byte sequences of known malicious code such as malicious shellcode (e.g., using METASPLOIT™ or COBALT STRIKE™ frameworks) or other notorious API hashes. In shellcode cyberattacks, a small piece of code is typically used as the payload in the post exploitation of a software vulnerability. It is called shellcode because it typically starts a command shell from which the attacker can control the compromised machine, but any piece of code that is memory resident and that does not have a executable file on (i.e., was not loaded from) a storage device can be called shellcode.

API hashing is a technique often used by malicious shellcode to make the usage of suspicious APIs difficult to detect or to save space when using an exploit. If an attacker wants to load APIs dynamically (i.e., when the malware/exploit actually runs), an attacker can use a modified (i.e., customized) version of the WINDOWS™ function GetProcAddress, that uses API hashing to return an API function address upon a hash value being passed as a parameter (i.e., rather than a name being passed as a parameter).

The following is an example of assembly code for an API hash value passed as a parameter:

mov r10d, 0xdb2d49b0
call RBP which generates the following assembly opcodes (i.e., instruction machine codes):

41 B? B0 49 2D DB FF D?

In this example, a given malicious signature 36 comprises the generated opcodes, and "?" indicates a wildcard (i.e., "?" does not require any match).

As described hereinbelow, processor 24 can detect a cyberattack by (a) detecting shellcode 22, (b) comparing the detected shellcode to malicious signatures 36, and (c) detecting a match between the detected shellcode and a given malicious signature 36.

In the configuration shown in FIG. 1A, processor 24 can execute, from memory 26, operating system 30. An example of operating system 30 is MICROSOFT WINDOWS™. In addition to loader 31, operating system 30 may comprise a set of operating system functions 42 that have r respective operating system function identifiers (IDs) 44 and are accessible via an application programming interface (API) 46.

Each API callback 32 comprises a hooked function ID 48 and API callback code 50. Upon operating system 30 receiving, via API 46, a call to a given function 42 having respective function ID 44, the operating system compares the respective function ID to hooked function IDs 48. If operating system 30 detects a match between the respective function ID and a given hooked function ID 48, then the operating system calls API callback code 50 for the given hooked function ID. Upon processor 24 executes API callback code 50 for the given hooked function ID, operating system 30 executes the given function (i.e., requested by the call).

Figure 1B:
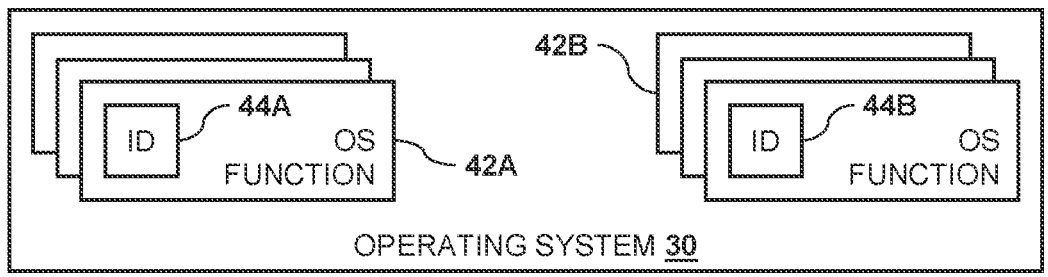

In embodiments described herein (as shown in FIG. 1B), functions 42 and their respective function IDs 44 can be differentiated by appending a letter to the identifying numeral, so that the functions comprise hooked functions 42A and non-hooked functions 42B, and the function IDS comprise function IDs 44A (i.e., for functions 42A) and 44B (i.e., for functions 42B).

In some embodiments, any function 42 whose respective function ID 44 matches any given hooked function ID 48 may also be referred to as a given hooked function 42A. Likewise, any function 42 whose respective function ID 44 does not match any given hooked function ID 48 may also be referred to as a given non-hooked function 42A Configuring a given function 42 as a given hooked function 42A is described in the description referencing FIG. 4 hereinbelow.

In embodiments herein, for each given hooked function 42A, API callback code 50 generates and analyzes stack trace 34 that comprises a set of stack frames 52, wherein the second to last stack frame 52 in the stack trace references the call to the given hooked function. Stack frames 52 are described in the description referencing FIG. 3 hereinbelow.

In some embodiments, operating system 30 also comprises a set of registration routines 47 that are accessible via calls to API 46. As described in the description referencing FIG. 4 hereinbelow, registration routines 47 can "register" (i.e., associate) a given operating system function 42 with a given API callback code 50 so as to define the given system function as a given hooked function 42A.

Processor 24 can execute in different processor modes 54 (also known as states and privilege levels). Examples of processor modes 54 include, but are not limited to, kernel mode and user mode. Features of kernel mode may enable processor 24 to have a high set of privileges so that the processor has direct and unrestricted access to system resources and processes (described in the description referencing FIG. 2 hereinbelow). Embodiments described herein utilize triggers in kernel mode that were called from user mode, which enables processor 24 to generate stack trace 34 for hooked functions 42A (i.e., hooks and callbacks) that were triggered by user mode programs without injecting code into every process in the system.

In some embodiments computing device 20 may comprise one or more hardware subsystems 56. For example, a given hardware subsystem 56 may comprise an Input/Output (I/O) device such as a network controller or a storage controller.

Figure 2:
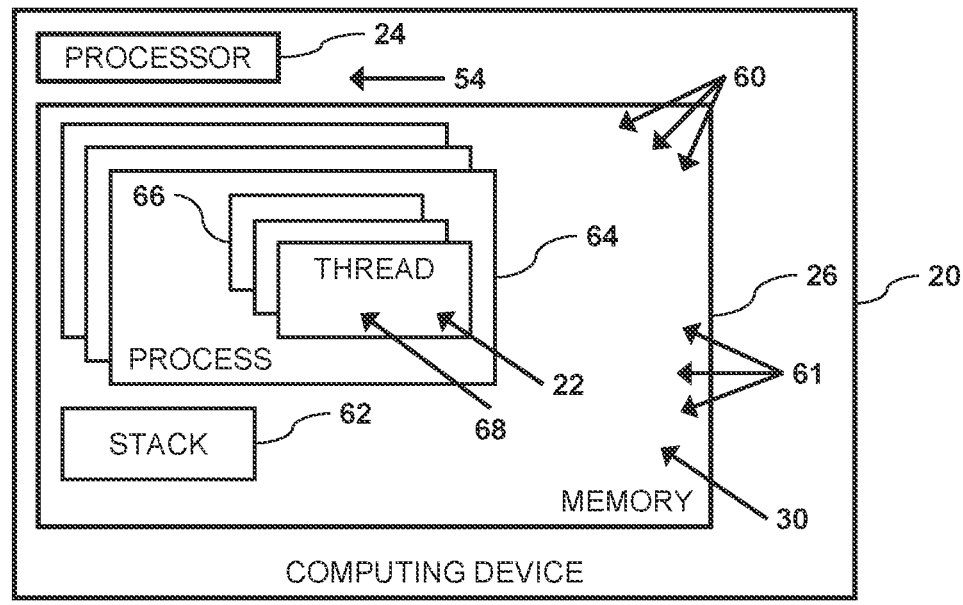
FIG. 2 is a block diagram showing processes and threads executing in the memory of the computing device, in accordance with an embodiment of the present invention.

FIG. 2 is a block diagram showing hardware and software components of memory 26, while processor 24 executes operating system 30, in accordance with an embodiment of the present invention.

In the configuration shown in FIG. 2, memory 26 comprises a set of memory pages 60 (i.e., memory 26 is divided into a set of memory pages 60 that may also be referred to as buffers 60) and has a set of memory addresses 61. While executing operating system 30, the operating system manages a stack 62 (i.e., an area in memory 26 that can store temporary variables created by functions 42), and a set of processes 64 having respective threads 66. Each given thread 66 may have a respective context 68 that comprises information the given thread needs to seamlessly resume execution (i.e., if suspended).

As described supra, mode 54 for processor 24 can be either kernel mode or user mode. In embodiments described herein, if processor 24 executes a given thread 66 while the processor is in kernel mode, then the given thread can be considered to be executing in kernel mode. Likewise, if processor 24 executes a given thread 66 while the processor is in user mode, then the given thread can be considered to be executing in user mode.

In some embodiments, processor 24 stores stack 62, processes 64, and threads 66 in respective memory pages 60. As described hereinbelow, embodiments of the present invention enable processor 24 to detect malicious shellcode 22 that was executing in a given thread 66.

Figure 3:
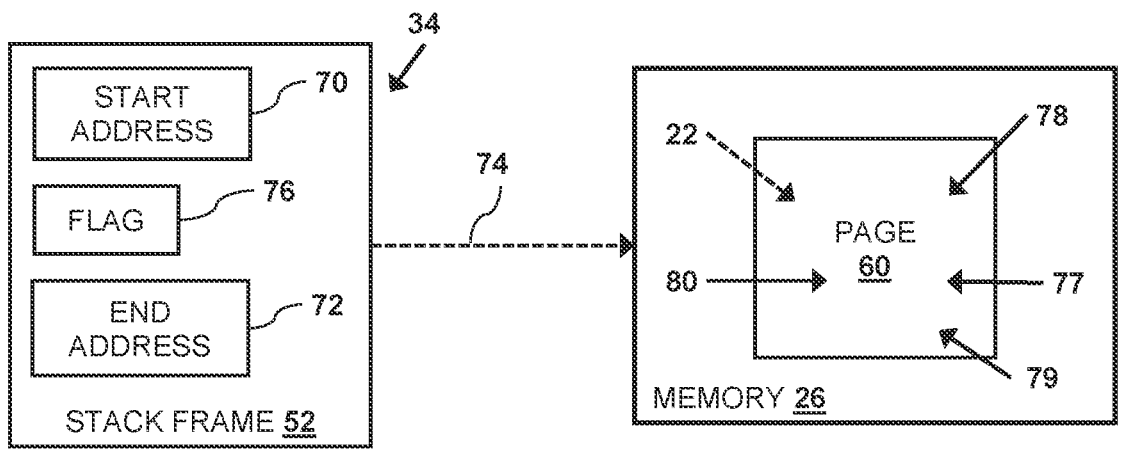
FIG. 3 is a block diagram that shows a mapping between a stack frame in the stack trace and a page in the memory of the computing device, in accordance with the first embodiment of the present invention.

FIG. 3 is a block diagram that shows a mapping between a given stack frame 52 in stack trace 34 and a given memory page 60, in accordance with the first embodiment of the present invention.

In the configuration shown in FIG. 3, each given stack frame 52 comprises a start address 70 (i.e., in memory 26) and an end address 72 (i.e., in memory 26) that references, as shown by an arrow 74 a given memory page 60. In some embodiments, each given stack frame 52 may comprise a flag 76 that is described hereinbelow.

Memory page 60 stores contents 78 and has permissions 80. Using embodiments described herein, processor 24 is configured to identify a given memory page 60 whose respective contents 78 comprises malicious shellcode 22.

In embodiments described herein, processor 24 can detect shellcode 22 in a given memory page 60 by detecting, in stack trace 34, a given stack frame 52 that references a return address comprising a return address 77 (i.e., a given address 61) for that references a shellcode region 79 in memory 26. Shellcode region 79 comprises (i.e., stores) shellcode 22 that, as described supra, shellcode 22 comprises computer executable code that loader 31 did not load from any executable file 40 or file 41 (stored on storage device 28) into memory 26.

In some embodiments, flag 76 indicates whether or not contents 78 were previously loaded by processor 24 from (a given file 40 (or file 41) on storage device 28. For example, in WINDOWS™ environments, processor 24 can set, for a given memory page 60, flag 76 to True (i.e., the processor loaded contents 78 from a given file 40/41 on storage device 28) if the processor detects the MEM_IMAGE flag for the given memory page. Likewise, processor 24 can set flag 76 to False (i.e., the processor did not load contents 78 from a given file 40/41 on storage device 28) if the processor does not detect the MEM_IMAGE flag for the given memory page. In embodiments herein, the content of a given memory page 60 whose respective flag 76 is False is more likely to include shellcode 22 (i.e., either benign or malicious).

Processor 24 comprises a general-purpose central processing units (CPU) or special-purpose embedded processors, which are programmed in software or firmware to carry out the functions described herein. This software may be downloaded to computing device 20 in electronic form, over a network, for example. Additionally or alternatively, the software may be stored on tangible, non-transitory computer-readable media, such as optical, magnetic, or electronic memory media. Further additionally or alternatively, at least some of the functions of processor 24 may be carried out by hard-wired or programmable digital logic circuits.

Examples of memory 26 and storage device 28 include dynamic random-access memories, non-volatile random-access memories, hard disk drives and solid-state disk drives.

In some embodiments, tasks described herein performed by processor 24 may be split among multiple physical and/or virtual computing devices. In other embodiments, these tasks may be performed in a managed cloud service.

Malicious Shellcode Detection

Figure 4:
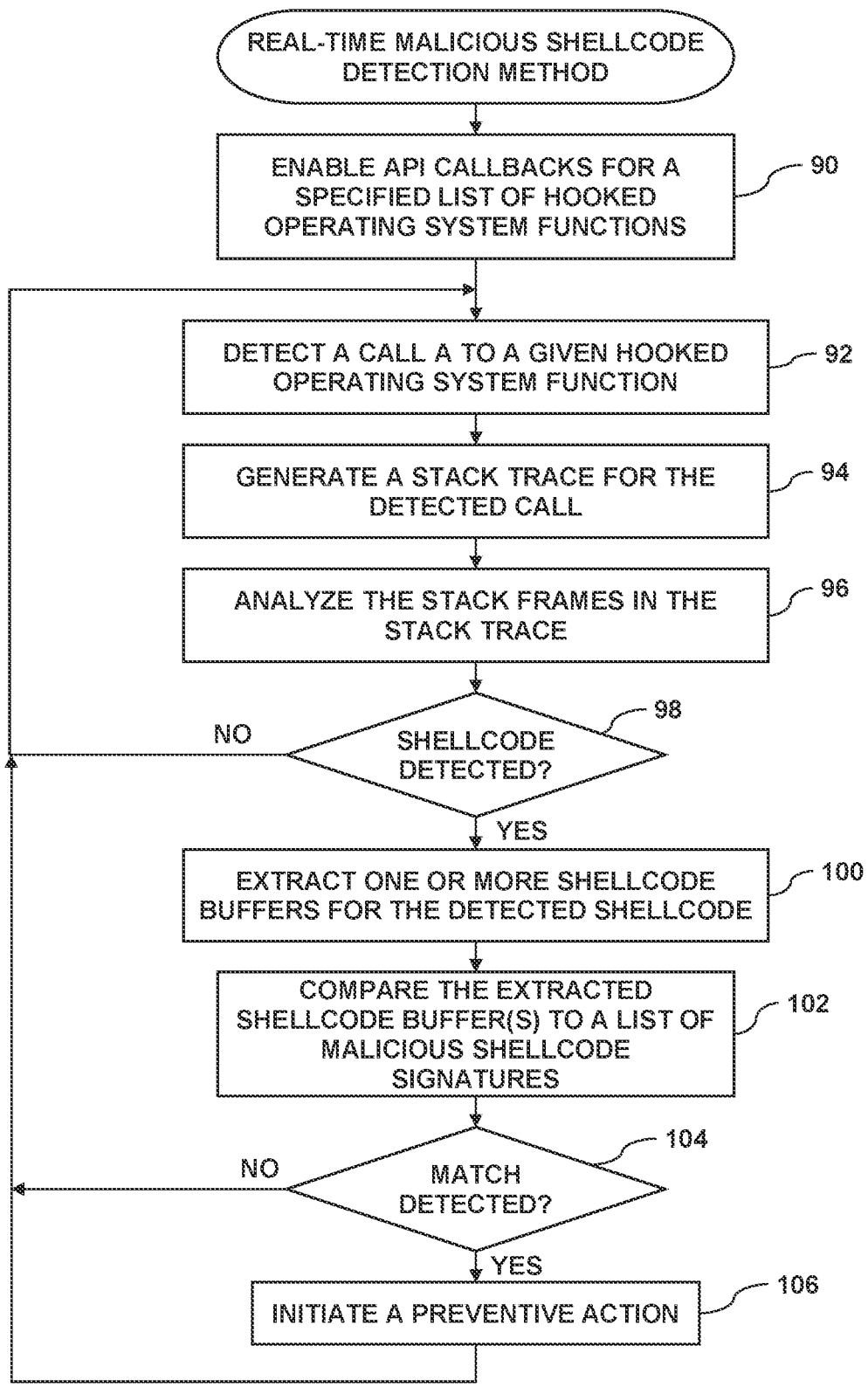
FIG. 4 is a flow diagram that schematically illustrates a method of real-time malicious shellcode detection, accordance with an embodiment of the present invention.

FIG. 4 is a flow diagram that schematically illustrates a method for processor 24 to detect malicious shellcode 22 in real-time, in accordance with an embodiment of the present invention.

In step 90, processor 24 configures (e.g., associates) a set of API callbacks 32 comprising API callback code 50 for one or more functions 42, thereby "hooking" one or more functions 42A. Upon calling a given hooked function 42, processor 24 executes the callback code associated with the given hooked function.

For example, if processor 24 is executing the WINDOWS™ operating system 30, in response to calling a given registration routine 47 with a parameter referencing a given API callback code 50, processor 24 registers (i.e., associates) the API callback code 50 to a given operating function 42 so as to define the given operating system function as a given hooked function 42A. In embodiments herein, every time the given hooked function is called, processor 24 executes the API callback code registered to the given hooked function.

In some embodiments, program instructions executing on processor 24 can use registration routines 47 to "hook" specific operations (e.g., creating a new thread 66 as described hereinbelow) performed by operating system 30. In these embodiments, the registration function hooks the operating system functions that perform the specific operations (i.e., register a given API callback code 50 with a given operating system function 42). In other words, when coding the program instructions comprising registration routines, a programmer (not shown) does not explicitly hook one or more operating system functions 42 (i.e., in source code for the program instructions).

The following are examples of registration routines 47 in the WINDOWS™ operating system that register a given operating system function 42 with a given API callback code 50:

PsSetLoadImageNotifyRoutine. This registration routine 47 executes on processor 24 so as to register a given callback code with a given operating system function 42 that is configured to load a given library 39 (i.e., comprising one or more executable files 40) from storage device 28.

PsSetCreateThreadNotifyRoutine. registration This routine 47 executes on processor 24 so as to register a given callback code 50 (referenced in a passed parameter) with a given operating system function 42 that is configured to create a new thread 66.

PsSetCreateProcessNotifyRoutine. This registration routine 47 executes on processor 24 so as to register a given callback code 50 (referenced in a passed parameter) with a given operating system function 42 that is configured to create a new process 64.

FWPS_LAYER_ALE_AUTH_CONNECT_V4. This registration routine 47 executes on processor 24 so as to register a given callback code 50 (referenced in a passed parameter) with a given operating system function 42 that is configured to initiate a new connection (e.g., to a specific socket).

FWPS_LAYER_ALE_AUTH_LISTEN_V4. This registration routine 47 executes on processor 24 so as to register a given callback code 50 (referenced in a passed parameter) with a given operating system function 42 that is configured to "listen" (e.g., place a specific socket in a state so as to listen for) a new incoming connection.

In other embodiments, a programmer can explicitly hook operating system functions 42 when developing the program instructions to be executed on processor 24. The following are examples of operating system functions 42 (i.e., system calls that program instructions can call via API 46) in the WINDOWS™ operating system:

NtDeviceIoControlFile. This operating system function 42 communicates with kernel-mode drivers so as to provide a view of input data and output data.

NtAllocateVirtualMemory. This operating system function 42 allocates one or more memory pages 60 to a given process 64.

NtProtectVirtualMemory. This operating system function 42 changes permissions 80 for a given memory address 61.

NtReadVirtualMemory. This operating system function 42 reads (i.e., retrieves one or more values from) a given buffer 60 at a given memory address 61 in a second process 64.

NtWriteVirtualMemory. This operating system function 42 writes a given buffer 60 (i.e., storing one or more values) to a given memory address 61 in a given process 64. In some embodiments the given process can be a current or a remote process.

NtSetContextThread. This operating system function 42 sets a thread context 68 in a given thread 66.

NtQueueApcThread. This operating system function 42 adds a new asynchronous procedure call (APC) to an APC queue in a given thread 66.

NtUserSetWindowsHookEx. This operating system function 42 injects a DLL (i.e., executable code) into a given process 64 (e.g., a remote process).

In some embodiments, a systems administrator (not shown) may add/delete/modify API callbacks 32 as needed.

In step 92, processor 24 detects a call to a given hooked function 42A. In other words, program instructions executing on processor 24 call the given hooked function.

In step 94, in response to detecting the call to the given hooked function, processor 24 generates stack trace 34 (i.e., from a plurality of the stack traces in memory 26) whose stack frames 52 a specific number (e.g., 20, 25, 30) of operations performed by a given process 64 ending in the detected call. In WINDOWS™ environments, processor 24 can call the operating system function RtlWalkFrameChain so as to generate stack trace 34 by "walking" stack 62 backwards.

In step 96, processor 24, using embodiments described supra, analyzes stack frames 52 so as to determine if any of the preceding (i.e., in terms of order of execution) stack frames (i.e., the stack frames preceding the stack frame referencing the detected call) comprises shellcode 22. Using embodiments described supra, processor 24 can check if flag 76 is False for any memory pages 60 referenced by the preceding stack frames.

In some embodiments, steps 94 and 96 are performed by API callback code 50 executing on processor 24. To analyze stack frames 52, processor 24 can iterate through the stack frames 52, and check for (the first) return address 77 that corresponds to shellcode memory region 79.

In step 98, if processor 104 detects that shellcode 22 in contents 78 of the memory pages 60 referenced by any of the preceding stack frames, then in 100, the processor extracts one or more portions of the detected shellcode, and stores the one or more extracted portions of the extracted shellcode to one or more extracted shellcode buffers 38. In some embodiments, each given extracted shellcode buffer 38 comprises a sequence of bytes (i.e., in the memory) storing shellcode 22.

In step 102, processor 24 compares the one or more extracted shellcode buffers 38 to malicious signatures 36.

In step 104, if processor 24 detects a match between extracted any shellcode buffer 38 and a given malicious signature 36, then in step 106, the processor initiates a preventive action, and the method continues with step 92.

In some embodiments, the preventive action may comprise identifying a given process 64 that comprises the detected shellcode, and then terminating execution of the process. In some embodiments, if processor 24 detects any additional processes 64 related (i.e., parent or child) to the given process, then the processor can terminate execution of the detected additional process(es) as well.

Returning to step 104, if processor 24 does not detect a match between any extracted shellcode buffer 38 and any malicious signature 36, then the method continues with step 92.

Returning to step 98, if processor 104 does not detect shellcode 22 in contents 78 of the memory pages 60 referenced by any of the preceding stack frames, then the method continues with step 92.

The following is an example of (contents of) stack frames 52 (numbered 1-13):
1. c:\\windows\\system32\\ntdll.dll+0xddc5|
2. c:\\windows\\system32\\ntdll.dll+0xda52|
3. c:\\windows\\system32\\ntdll.dll+0xd925|
4. c:\\windows\\system32\\ntdll.dll+0x84c|
5. c:\\windows\\system32\\ntdll.dll+0xca9b|
6. c:\\windows\\system32\\ntdll.dll+0xa56d|
7. c:\\windows\\system32\\ntdll.dll+0x26a7e|
8. c:\\windows\\system32\\ntdll.dll+0x2651d|
9. c:\\windows\\system32\\ntdll.dll+0x9efc|
10. c:\\windows\\system32\\kernelbase.dll+0x2cd7f|
11. c:\\windows\\system32\\kernelbase.dll+0x25721|
12. c:\\windows\\system32\\kernelbase.dll+0x6b7e9|
13. 0x2012dbd In this example, the stack frame "12" resolves to processor 24 loading a given library 39 (i.e., a given hooked function 42A), and the stack frame "13" references shellcode 22.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting a computing device, which includes a processor and a memory and is coupled to a storage device storing a set of one or more files, the method comprising:
   detecting, by the processor, a call to a specified function for execution by the processor;
   generating, in the memory, a stack trace for the call to the specified function;
   detecting, in the stack trace, a stack frame comprising a return address referencing a page in the memory containing executable code, the stack frame including a flag indicating whether the executable code was loaded from a file on the storage device;
   in response to the flag indicating that the executable code was not loaded from any file on the storage device, comparing the referenced executable code to a list of malicious shellcode; and
   initiating a preventive action upon detecting a match between the referenced executable code and one of malicious shellcodes in the list.

2. The method according to claim 1, wherein the referenced executable code executes in kernel mode.

3. The method according to claim 1, wherein the referenced executable code executes in user mode.

4. The method according to claim 1, wherein the shellcode comprises an application programming interface (API) hashing algorithm.

5. The method according to claim 1, wherein the list of malicious shellcode comprises a list of signatures, and wherein comparing the referenced executable code to the list of malicious shellcode comprises extracting one or more shellcode buffers from the referenced executable code, and comparing the one or more extracted shellcode buffers to the list of signatures.

6. The method according to claim 5, wherein a signature in the list comprises a wildcard.

7. The method according to claim 1, wherein the specified function loads an executable library to the memory.

8. The method according to claim 1, wherein the specified function creates a new thread in the memory.

9. The method according to claim 1, wherein the specified function creates a new process in the memory.

10. The method according to claim 1, wherein the specified function initiates a new connection.

11. The method according to claim 1, wherein the specified function listens for an incoming connection.

12. The method according to claim 1, wherein the specified function communicates with kernel drivers so as to provide a view of input data and output data.

13. The method according to claim 1, wherein the memory comprises a set of memory pages, and wherein the specified function allocates one or more of the memory pages to a process in the memory.

14. The method according to claim 1, wherein the memory comprises a set of memory addresses, and wherein the specified function changes a memory permission of a given memory address.

15. The method according to claim 1, wherein the specified function retrieves a buffer from an address in the memory.

16. The method according to claim 1, wherein the specified function writes a buffer to an address in the memory.

17. The method according to claim 1, wherein the specified function sets a thread context of a thread in the memory.

18. The method according to claim 1, wherein the specified function adds an asynchronous procedure call (APC) to an APC queue in a thread in the memory.

19. The method according to claim 1, wherein the specified function injects additional executable code into a process in the memory.

20. An apparatus for protecting a computing device, comprising:
   a memory; and
   a processor coupled to a storage device storing a set of one or more files and configured:
   to detect a call to a specified function for execution by the processor,
   to generate, in the memory a stack trace for the call to the specified function,
   to detect, in the stack trace, a stack frame comprising a return address referencing a page in the memory containing executable code. the stack frame including a flag indicating whether the executable code was loaded from a file on the storage device,
   to compare the referenced executable code to a list of malicious shellcode, in response to the flag indicating that the executable code was not loaded from any file on the storage device, and
   to initiate a preventive action upon detecting a match between the referenced executable code and one of malicious shellcodes in the list.

21. A computer software product for protecting a computing device, which includes a processor and a memory and is coupled to a storage device storing a set of one or more files, the computer software product comprising a non-transitory computer-readable medium, in which program instructions are stored, which instructions, when read by a computer, cause the computer:
   to detect a call to a specified function for execution by the processor;
   to generate, in the memory, a stack trace for the call to the specified function;
   to detect, in the stack trace, a stack frame comprising a return address referencing a page in the memory containing executable code, the stack frame including a flag indicating whether the executable code was loaded from a file on the storage device;
   to compare the referenced executable code to a list of malicious shellcode, in response to the flag indicating that the executable code was not loaded from any file on the storage device; and
   to initiate a preventive action upon detecting a match between the referenced executable code and one of malicious shellcodes in the list.

* * * * *